United States Patent
Oohigashi

(10) Patent No.: US 6,823,912 B2
(45) Date of Patent: Nov. 30, 2004

(54) PNEUMATIC TIRE HAVING ASYMMETRIC BLOCK PATTERN

(75) Inventor: Hiroshi Oohigashi, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 0 days.

(21) Appl. No.: 09/741,046

(22) Filed: Dec. 21, 2000

(65) Prior Publication Data

US 2001/0003999 A1 Jun. 21, 2001

(30) Foreign Application Priority Data

Dec. 21, 1999 (JP) .............................. 11-362931

(51) Int. Cl.[7] .......................... B60C 11/11; B60C 111/00
(52) U.S. Cl. .................................... 152/209.8; 152/904
(58) Field of Search ........................ 152/209.8, 209.9, 152/209.28, 904; D12/525–532

(56) References Cited

U.S. PATENT DOCUMENTS

| | | | | |
|---|---|---|---|---|
| 3,705,613 | A | * | 12/1972 | Verdier |
| 4,962,801 | A | | 10/1990 | Tsuda |
| 5,002,109 | A | * | 3/1991 | Shepler et al. |
| 5,105,864 | A | * | 4/1992 | Watanabe et al. |
| D326,632 | S | * | 6/1992 | Tsuda et al. |
| 5,323,824 | A | * | 6/1994 | Swift et al. |
| 5,603,785 | A | * | 2/1997 | Weber et al. |
| D391,535 | S | * | 3/1998 | Johenning et al. |
| 6,220,324 | B1 | * | 4/2001 | Oohigashi |
| 6,341,633 | B1 | * | 1/2002 | Adlon et al. |

FOREIGN PATENT DOCUMENTS

| | | | |
|---|---|---|---|
| DE | 3815829 | * | 12/1988 |
| DE | 19722572 | | 12/1998 |
| EP | 0321384 | | 6/1989 |
| EP | 0943464 | | 9/1999 |
| JP | 2-212202 | * | 8/1990 |
| JP | 3-32906 | * | 2/1991 |
| JP | 3-104709 | * | 5/1991 |
| JP | 5-178019 | * | 7/1993 |

* cited by examiner

Primary Examiner—Steven D. Maki
(74) Attorney, Agent, or Firm—Birch, Stewart, Kolasch & Birch, LLP

(57) ABSTRACT

A pneumatic tire comprises: a tread portion provided with an asymmetric block pattern and having an inside tread edge and an outside tread edge to be placed on the inside and outside of a vehicle, respectively; outside lateral grooves extending from the outside tread edge to a tread center region, each having a groove center line X0 inclined towards one direction with respect to the tire circumferential direction at an angle θ0 of from 40 to 60 degrees with respect to the tire circumferential direction; inside lateral grooves extending from the inside tread edge to the tread center region, each having a groove center line X5 inclined at an angle θ5 of from 70 to 100 degrees with respect to the tire circumferential direction; each portion between the circumferentially adjacent outside lateral grooves being divided into outside blocks by first to fourth outside connecting grooves extending thereacross; the first outside connecting groove having a first groove center line X1, the second outside connecting groove having a second groove center line X2, the third outside connecting groove having a third groove center line X3, the fourth outside connecting groove having a fourth groove center line X4, and the first to fourth groove center lines X1 to X4 inclined reversely to the groove center lines X0 of the outside lateral grooves with respect to the tire circumferential direction, and the inclination angles θ1 to θ4 of the first to fourth groove center lines X1 to X4 with respect to the tire circumferential direction being in a range of from 20 to 50 degrees and being different from each other.

9 Claims, 4 Drawing Sheets

PRIOR ART

PNEUMATIC TIRE HAVING ASYMMETRIC BLOCK PATTERN

The present invention relates to a pneumatic tire, more particularly to an asymmetrical tread pattern which can be employed in both of right tire and left tire to improve off-road grip during high-speed running and thus which is suitable for racing use such as rally, dirt trial and the like.

In the laid-open Japanese patent application JP-A-11-268506 (corresponding to EP 0943464 A2), a pair of asymmetrical tread patterns specialized for right tire and left tire to improve off-road grip were proposed by the present inventor.

Under actual conditions in rally, dirt trial or the like, there are many occasions such that the tire is punctured, and a tire on one side of the vehicle wears more than a tire on the other side. In the former case, the vehicle must be equipped with two spares for right and left tires. In the later case, if the worn tire and the less worn tire are exchanged in their positions to even the wear, various performances get out of order due to the directional tread patterns.

It is therefore, an object of the present invention to provide a pneumatic tire which can be used on both sides of a vehicle and which has a tread pattern being capable of improving off-load grip such as traction, braking and side grip.

According to the present invention, a pneumatic tire comprises a tread portion provided with a block pattern being asymmetric about the tire equator, the tread portion having an inside tread edge and an outside tread edge to be placed on the inside and outside of a vehicle, respectively, outside lateral grooves extending from the outside tread edge to a tread center region, each having a groove center line X0 inclined towards one direction with respect to the tire circumferential direction at an angle θ0 of from 40 to 60 degrees with respect to the tire circumferential direction, inside lateral grooves extending from the inside tread edge to the tread center region, each having a groove center line X5 inclined at an angle θ5 of from 70 to 100 degrees with respect to the tire circumferential direction, each portion between the circumferentially adjacent outside lateral grooves divided into outside blocks by outside connecting grooves extending thereacross, the outside connecting grooves comprising a first groove, a second groove, a third groove and a fourth groove arranged in this order from the outside tread edge toward the inside tread edge, the first outside connecting groove having a first groove center line X1, the second outside connecting groove having a second groove center line X2, the third outside connecting groove having a third groove center line X3, the fourth outside connecting groove having a fourth groove center line X4, the first to fourth groove center lines X1 to X4 inclined reversely to the groove center lines X0 of the outside lateral grooves with respect to the tire circumferential direction, and the inclination angles θ1 to θ4 of the first to fourth groove center lines X1 to X4 with respect to the tire circumferential direction being in a range of from 20 to 50 degrees and being different from each other.

An embodiment of the present invention will now be described in detail in conjunction with the accompanying drawings.

Figure 3:
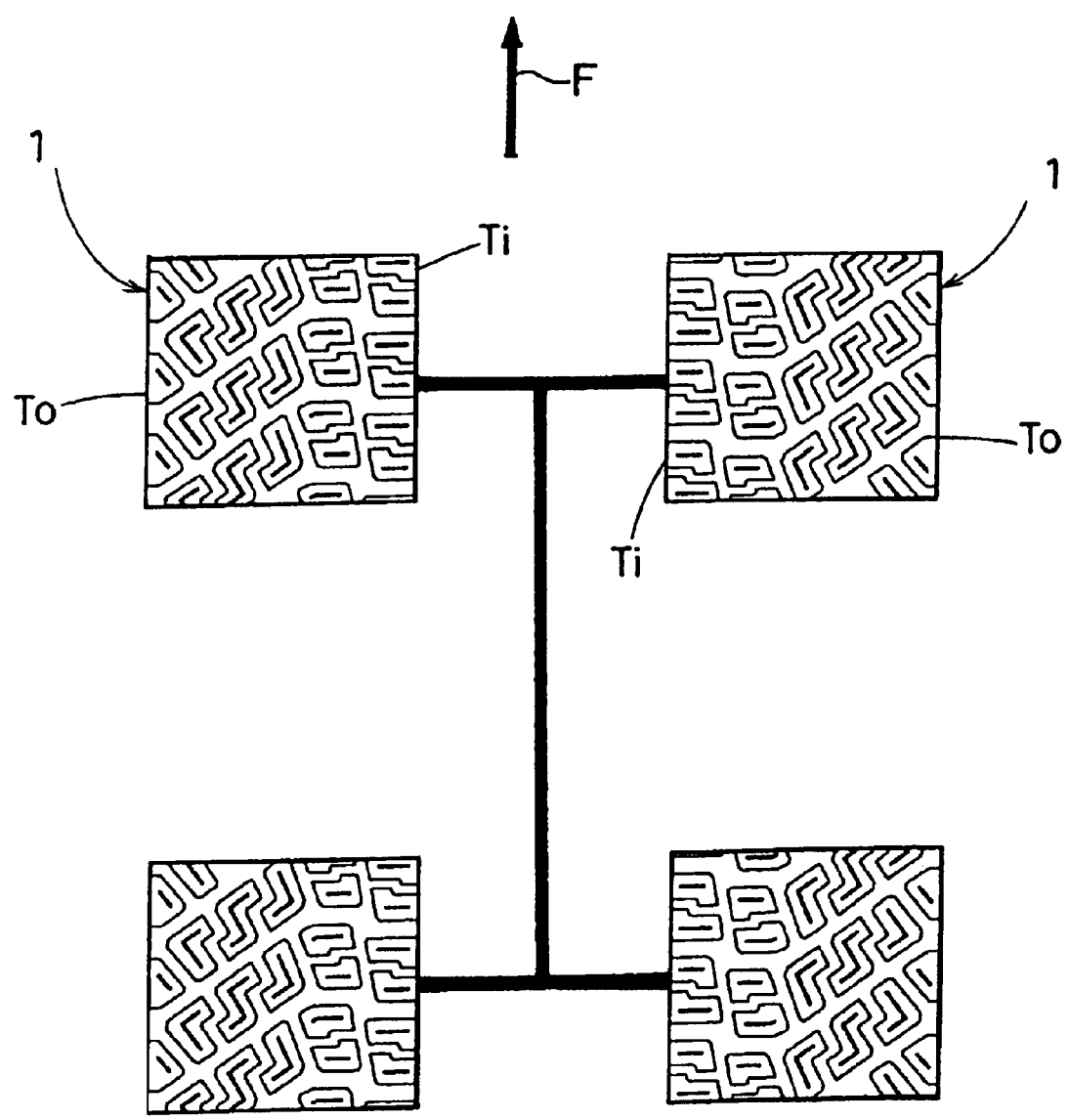
FIG. 3 is a schematic view showing the mounting position and direction of the tire in relation to a vehicle.

Pneumatic tire 1 according to the present invention is designed to be mounted on a vehicle as shown in FIG. 3, that is, a tread edge To is position on the outside and a tread edge Ti is position on the inside with respect to the vehicle (hereinafter the "outside tread edge To" and "inside tread edge Ti"). The tire 1 can be used as the left tire and right tire.

In this specification, the terms "inside" and "outside" will be used to mean the "inside-tread-edge-Ti side" and "outside-tread-edge-To side".

The pneumatic tire 1 is provided with tread grooves in the tread portion defined between the outside tread edge To and inside tread edge Ti.

Figure 1:
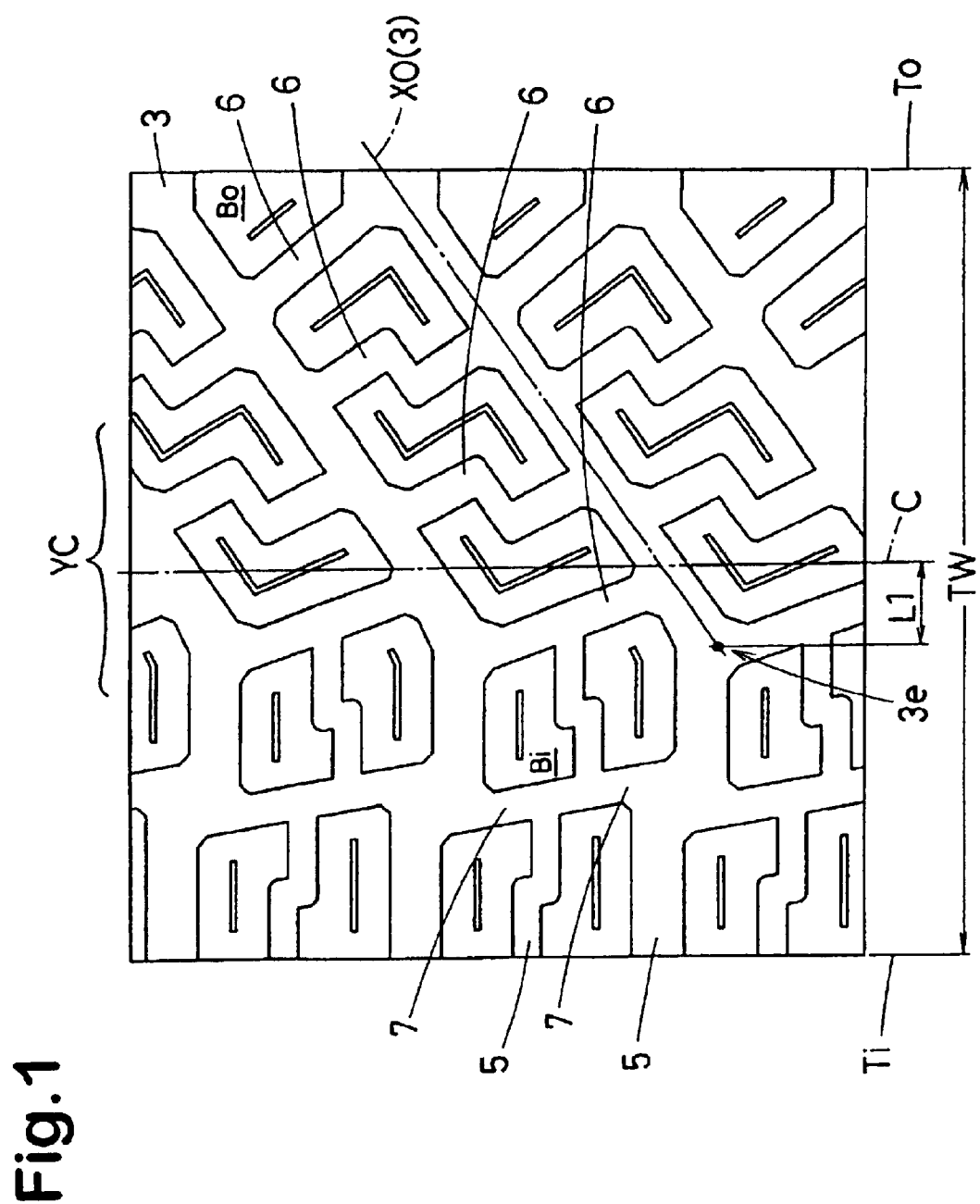
FIG. 1 shows a tread pattern according to the present invention.

FIG. 1 shows an example of the tread pattern defined by the tread grooves. The tread grooves include:

outside lateral grooves 3 extending from the outside tread edge To into a tread center region YC;

inside lateral grooves 5 extending from the inside tread edge Ti into the tread center region YC;

outside connecting grooves 6 extending between the outside lateral grooves 3 to divide each portion between the adjacent outside connecting grooves 6 into outside blocks Bo; and inside connecting grooves 7 extending between the inside lateral grooves 5 to divide each portion between the adjacent inside lateral grooves 5 into inside blocks Bi.

Here, the tread center region YC is a central region of the tread portion having a 40% width of the tread width TW and centered on the tire equator C.

It is preferable for both of the traction and side grip that the outside lateral grooves 3 extend beyond the tire equator C.

The outside lateral grooves 3 each have a groove center lines X0 inclined towards the same circumferential direction at an angle θ0 of from 40 to 60 degrees with respect to the circumferential direction of the tire.

In this example, the inside ends 3e of the outside lateral grooves 3 are positioned on the inside of the tire equator C at distances L1 of about 10% of the tread width TW from the tire equator C. The outside lateral grooves 3 are a substantially straight groove, but a nonlinear groove may be also used.

If the angle θ0 is more than 60 degrees, the tread pattern becomes highly directional, and tire performance shows a large difference between the left turn and right turn, and the steering stability deteriorates. If the angle θ0 is less than 40 degrees, the side grip is liable to decrease because the rigidity of the outside blocks Bo decreases.

In FIG. 1, the inclinations of the outside lateral grooves 3 are a right-side upward inclination. Accordingly, all the outside lateral grooves of the tires mounted on the vehicle are, as shown in FIG. 3, also a right-side upward inclination. It is however, possible to provide the outside lateral grooves 3 with a left-side upward inclination. The inclination may be determined according to course conditions in which the tire is used.

With respect to the circumferential direction of the tire, the outside connecting grooves 6 are generally inclined reversely to the outside lateral grooves 3.

In this example, the outside connecting grooves 6 are a first outside connecting groove 6A, a second outside connecting groove 6B, a third outside connecting groove 6C and a fourth outside connecting groove 6D which are disposed in this order from the outside to the inside, whereby each portion between the circumferentially adjacent outside lateral grooves 3 is divided into a first outside block Bo1, a second outside block Bo2, a third outside block Bo3 and a fourth outside block Bo4 which are disposed in this order from the outside to the inside. The outside connecting grooves 6A, 6B, 6C and 6D have groove center lines X1, X2, X3 and X4 inclined at angles θ1, θ2, θ3 and θ4 in a range of from 20 to 50 degrees with respect to the circumferential direction of the tire.

In each portion between the circumferentially adjacent outside lateral grooves 3, the angle θ1, angle θ2, angle θ3 and angle θ4 are different from each other.

In a off-road race, there are many occasions to run under a relatively large tire slip angle. Therefore, it is very important for the tire to display a large side grip stably under a wide range from zero slip angle during straight running to such a large slip angle during cornering. By changing the angles θ1–θ4, it becomes possible to match one of the outside connecting grooves 6A–6D with the slip angle to derive a maximum side grip under wide running conditions.

If the angles θ1–θ4 are less than 20 degrees, vehicle control is liable to become difficult at a small slip angle. If more than 50 degrees, the edges of the blocks excessively decrease in the total circumferential component and it becomes difficult to obtain the necessary side grip.

In each portion between the circumferentially adjacent outside lateral grooves 3, the angles θ1, θ2, θ3 and θ4 are preferably increased from the outside to the inside. (θ1>θ2>θ3>θ4) This relation may improve the steering response and helps to reduce uneven wear between the outside blocks.

If the differences between the angles θ1–θ4 are too small, the side grip tends to show a peak under a specific running condition. Therefore, the controllability decreases, and as a result, the side grip as whole tends to decrease. Therefor, the differences between the angles θ1–θ4, that is, θ1–θ2, θ2–θ3, θ3–θ4 are preferably set in a range of at least 5 degrees. Further, it is preferable that these differences are substantially same values whose fluctuation is +−1 degrees.

The outside connecting groove 6 may be a straight groove or a crank-shape groove. In this example, the first and forth outside connecting grooves 6A and 6D are straight. The second and third outside connecting grooves 6B and 6C are crank-shaped.

In case of crank-shape, it is preferable that a middle segment 21, which connects two main segments 20 with each other, extends substantially parallel with the outside lateral grooves 3, and the difference between the angle θA of the groove center line XA of the middle segment 21 and the angle θ0 of the adjacent outside lateral groove 3 is less than 10 degrees. Here, the main segments 20 are defined as having the groove center line (X1, X2, X3 or X4) inclined at the above-mentioned angle (θ1, θ2, θ3 or θ4).

Figure 2:
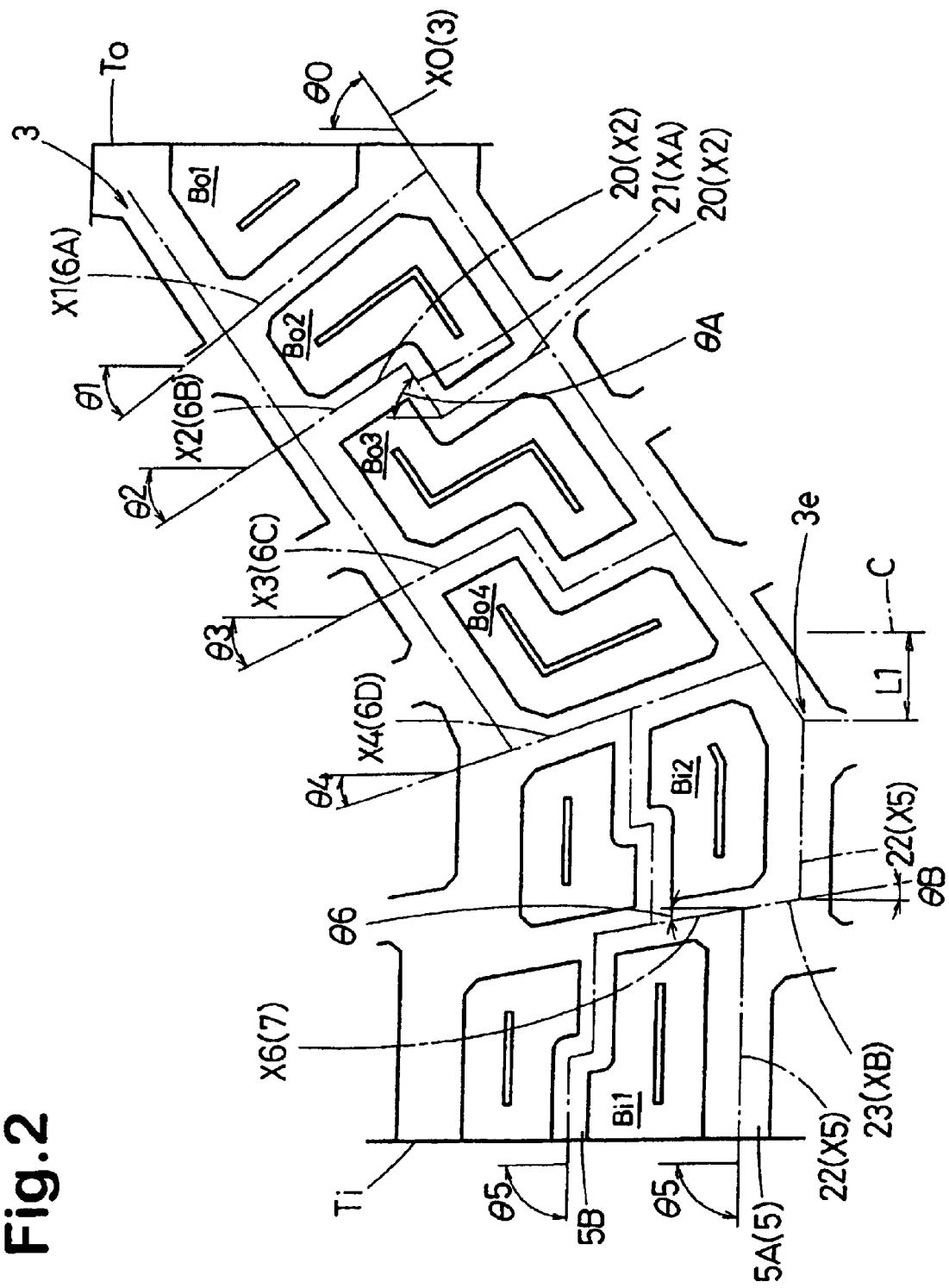
FIG. 2 is an enlarged view of a part between the lateral grooves thereof.

As to the shapes of the first to fourth outside blocks Bo1 to Bo4 in this example, as shown in FIG. 2, the first outside block Bo1 is generally a triangle, the second outside block Bo2 is a L-shape, the third outside block Bo3 is a s-shape or a crank shape, and the fourth outside block Bo4 is a L-shape.

The above-mentioned inside lateral grooves 5 extend from the inside tread edge Ti into the tread center region TC. The inside lateral groove 5 has a groove center line X5 inclined at angle θ5 of from 70 to 100 degrees with respect to the circumferential direction of the tire, wherein, in case of the angle θ5 less then 90 degrees, the inclination is reverse to the outside lateral grooves 3. Thus, when the angle θ5 is more than 90 degrees, the inclination is the same as the outside lateral grooves 3.

The pitch number N5 of the inside lateral grooves 5 is more than the pitch number N3 of the outside lateral grooves 3, wherein the pitch number means the number of the grooves around the tire. In this example, N5/N3=2, and the inside lateral grooves 5 include inside lateral grooves 5A connected to one of the outside lateral grooves 3, and inside lateral grooves 5B connected to one of the fourth outside connecting grooves 6D. The grooves 5A alternate with the grooves 5B. Thus the outside ends of the inside lateral grooves 5A align with the inside ends of the outside lateral grooves 3, but it is also possible not to align such as the groove 5B.

Each portion between the circumferentially adjacent inside lateral grooves 5 is divided by at least one inside connecting groove 7 into inside blocks Bi. The number of the inside connecting grooves 7 is less than the outside connecting grooves 6. The inside connecting groove 7 are inclined towards the same direction as the outside connecting grooves 6 with respect to the circumferential direction of the tire. The inside connecting groove 7 has a groove center line X6 inclined at an angle θ6 of more than zero but less than the angle θ4 (for example about 10 degrees) with respect to the circumferential direction of the tire. In this example, a straight inside connecting groove 7 is provided. Thus, each portion is divided into two inside blocks Bi1 and Bi2. In order to improve traction, the inside blocks Bi1 and Bi2 are formed to be long sideways.

In this example, both the inside lateral grooves 5A and 5B are a bent groove. However, either or both of the inside lateral grooves 5A and 5B may be a straight groove.

In case of bent groove, it is preferable the inside lateral groove 5 consists of: main segments 22 which are defined as having the groove center line X5 inclined at the angle θ5; and one or more middle segments 23 which are substantially parallel with the inside connecting grooves 7. The difference between the angle θB of the groove center line XB of the middle segment 23 and the angle θ6 of the inside connecting groove 7 is less than 10 degrees. A bent groove similar to the inside lateral groove may be employed in the outside lateral grooves 3.

As to the shapes of the inside blocks in this example, as shown in FIG. 2, all the blocks Bi1a and Bi2 are L-shaped.

Further, the inclinations of all the inside connecting grooves 7 and outside connecting grooves 6 (main segments 20) are gradually decreased from the outside to the inside. In this example, θ6<θ4<θ3<θ2<θ1.

The widths and depths of the grooves 3, 5, 6 and 7 are usually set in a range of from 4 to 20 mm and a range of from 6 to 15 mm, respectively. In the tread pattern shown in FIG. 1, the groove depths of all the grooves 3, 5, 6 and 7 are the same.

Comparison Tests

Test tires of size 205/65R15 were made and tested for traction and sided grip, and controllability, and their differences between left turn and right turn, and further a lap time was measured in an off-the-road test course. The test course was an unpaved circuit course 2.2 km around. The test car was a 2000cc 4WD car.

The performances were evaluated into five ranks (standard=3) by the test drivers, wherein the larger the number, the better the performance. The test results and tire specifications are shown in Table 1.

Figure 4:
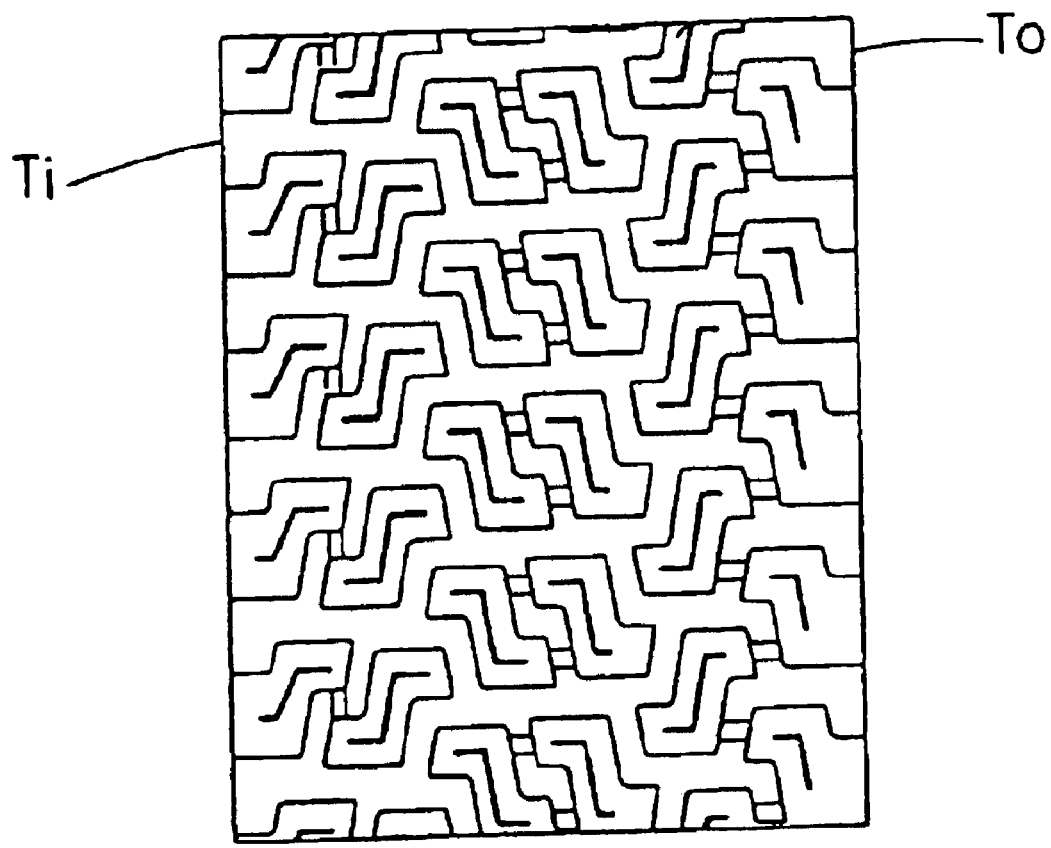
FIG. 4 shows a conventional tread pattern used in a comparative test.

In Ref.1, the test car was provided on all the wheels with identical tires having the tread pattern shown in FIG. 4. In

TABLE 1

|  | Ref.1 | Ex.1 | Ref.2 | Ref.3 | Ref.4 |
|---|---|---|---|---|---|
| Groove inclinations | | | | | |
| $\theta 0$ (deg) | — | 55 | 55 | 70 | 30 |
| $\theta 5$ (deg) | — | 90 | 90 | 90 | 90 |
| $\theta 1$ (deg) | — | 40 | 15 | 40 | 40 |
| $\theta 2$ (deg) | — | 34 | 15 | 34 | 34 |
| $\theta 3$ (deg) | — | 27 | 15 | 27 | 27 |
| $\theta 4$ (deg) | — | 20 | 15 | 20 | 20 |
| Side grip | 3 | 4 | 4 | 4 | 2.5 |
| Traction | 3 | 4 | 4 | 4 | 3 |
| Controllability | 3 | 4 | 2.5 | 2.5 | 2.5 |
| Difference | 3 | 3 | 3 | 2.5 | 3 |
| Lap time | 1'36"2 | 1'34"5 | 1'35"6 | 1'36"0 | 1'36"4 |

What is claimed is:

1. A pneumatic tire comprising:

a tread portion provided with a block pattern being asymmetric about the tire equator, said tread portion having an inside tread edge and an outside tread edge to be placed on the inside and outside of a vehicle, respectively, outside lateral grooves extending from the outside tread edge to a tread center region beyond the tire equator, each said outside lateral groove having a groove center line X0 inclined towards one direction with respect to the tire circumferential direction at an angle $\theta 0$ of from 40 to 60 degrees with respect to the tire circumferential direction, inside lateral grooves extending from the inside tread edge to the tread center region, each said inside lateral groove having a groove center line X5 inclined at an angle $\theta 5$ of from 70 to 100 degrees with respect to the tire circumferential direction, each portion between the circumferentially adjacent outside lateral grooves divided into outside blocks by outside connecting grooves extending thereacross, said outside connecting grooves comprising a first groove, a second groove, a third groove and a fourth groove arranged in this order from the outside tread edge toward the inside tread edge, the first outside connecting groove having a first groove center line X1, the second outside connecting groove having a second groove center line X2, the third outside connecting groove having a third groove center line X3, the fourth outside connecting groove having a fourth groove center line X4, the first to fourth groove center lines X1 to X4 inclined reversely to the groove center lines X0 of the outside lateral grooves with respect to the tire circumferential direction, wherein the inclination angles $\theta 1$, $\theta 2$, $\theta 3$ and $\theta 4$ of the first, second, third and fourth groove center lines X1, X2, X3 and X4, respectively, with respect to the tire circumferential direction are in a range of from 20 to 50 degrees and different from each other, and the inclination angles satisfy the following condition: $\theta 1 > \theta 2 > \theta 3 > \theta 4$, each portion between the circumferentially adjacent inside lateral grooves is divided into inside blocks by at least one inside connecting groove extending thereacross, said at least one inside connecting groove having a groove center line X6 inclined at an angle $\theta 6$ of more than 0 degrees with respect to the tire circumferential direction towards the same direction as the outside connecting grooves, wherein the inclination angles $\theta 1$, $\theta 2$, $\theta 3$, $\theta 4$, and $\theta 6$ of the center lines of said outside connecting grooves and said at least one inside connecting groove are gradually decreased from the outside tread edge to the inside tread edge, wherein:

the first groove center line X1 is straight,
the second groove center line X2 is a cranked line,
the third groove center line X3 is a cranked line; and
the fourth groove center line X4 is straight.

2. The pneumatic tire according to claim 1, wherein the groove center line X5 is a cranked line, and the groove center line X6 is straight.

3. A pneumatic tire comprising a tread portion provided with a block pattern being asymmetric about the tire equator, said tread portion having an inside tread edge and an outside tread edge to be placed on the inside and outside of a vehicle, respectively, outside lateral grooves extending from the outside tread edge to a tread center region beyond the tire equator, each said outside lateral groove having a groove center line X0 inclined towards one direction with respect to the tire circumferential direction at an angle $\theta 0$ of from 40 to 60 degrees with respect to the tire circumferential direction, inside lateral grooves extending from the inside tread edge to the tread center region, each said inside lateral groove having a groove center line X5 inclined at an angle $\theta 5$ of from 70 to 100 degrees with respect to the tire circumferential direction, each portion between the circumferentially adjacent outside lateral grooves divided into outside blocks by outside connecting grooves extending thereacross, said outside connecting grooves comprising a first groove, a second groove, a third groove and a fourth groove arranged in this order from the outside tread edge toward the inside tread edge, the first outside connecting groove having a first groove center line X1, the second outside connecting groove having a second groove center line X2, the third outside connecting groove having a third groove center line X3, the fourth outside connecting groove having a fourth groove center line X4, the first to fourth groove centerlines X1 to X4 inclined reversely to the groove center lines X0 of the outside lateral grooves with respect to the tire circumferential direction, wherein the inclination angles $\theta 1$, $\theta 2$, $\theta 3$ and $\theta 4$ of the first, second, third and fourth groove center lines X1, X2, X3 and X4, respectively, with respect to the tire circumferential direction are in a range of from 20 to 50 degrees and different from each other, and the inclination angles satisfy the following condition: $\theta 1 > \theta 2 > \theta 3 > \theta 4$, each portion between the circumferentially adjacent inside lateral grooves is divided into inside blocks by at least one inside connecting groove extending thereacross, said at least one inside connecting groove having a groove center line X6 inclined at an angle $\theta 6$ of more than 0 degrees with respect to the tire circumferential direction towards the same direction as the outside connecting grooves, wherein the inclination angles $\theta 1$, $\theta 2$, $\theta 3$, $\theta 4$, and $\theta 6$ of the center lines of said outside connecting grooves and said at least one inside connecting groove are gradually decreased from the outside tread edge to the inside tread edge, and angle differences $\theta1-\theta2$, $\theta2-\theta3$, and $\theta3-\theta4$ are not less than 5 degrees wherein the first groove center line X1 is straight, the second groove center line X2 is a cranked line, the third groove center line X3 is a cranked line: and the fourth groove center line X4 is straight.

4. The pneumatic tire according to claim 1, wherein $\theta5$ is substantially 90 degrees.

5. The pneumatic tire according to claim 1, wherein $\theta5$ is more than 90 degrees but not more than 100 degrees.

6. The pneumatic tire according to claim 1, wherein the groove center lines X0 of the outside lateral grooves are straight.

7. A combination of pneumatic tires comprising a left tire for one side of a vehicle and a right tire for the other side of the vehicle, each of the left tire and right tire comprising
a tread portion provided with a block pattern being asymmetric about the tire equator, said tread portion having an inside tread edge and an outside tread edge to be placed on the inside and outside of the vehicle, respectively, outside lateral grooves extending from the outside tread edge to a tread center region, each said outside lateral groove having a groove center line X0 inclined towards one direction with respect to the tire circumferential direction at an angle $\theta0$ of from 40 to 60 degrees with respect to the tire circumferential direction, inside lateral grooves extending from the inside tread edge to the tread center region, each said inside lateral groove having a groove center line X5 inclined at an angle $\theta5$ of from 70 to 100 degrees with respect to the tire circumferential direction, each portion between the circumferentially adjacent outside lateral grooves divided into outside blocks by outside connecting grooves extending thereacross, said outside connecting grooves comprising a first groove, a second groove, a third groove and a fourth groove arranged in this order from the outside tread edge toward the inside tread edge, the first outside connecting groove having a first groove center line X1, the second outside connecting groove having a second groove center line X2, the third outside connecting groove having a third groove center line X3, the fourth outside connecting groove having a fourth groove center line X4, the first to fourth groove center lines X1 to X4 inclined reversely to the groove center lines X0 of the outside lateral grooves with respect to the tire circumferential direction, wherein the inclination angles $\theta1$, $\theta2$, $\theta3$ and $\theta4$ of the first, second, third and fourth groove center lines X1, X2, X3 and X4, respectively, with respect to the tire circumferential direction are in a range of from 20 to 50 degrees and different from each other, and the inclination angles satisfy the following condition: $\theta1>\theta2>\theta3>\theta4$, each portion between the circumferentially adjacent inside lateral grooves is divided into inside blocks by at least one inside connecting groove extending thereacross, said at least one inside connecting groove having a groove center line X6 inclined at an angle $\theta6$ of more than 0 degrees with respect to the tire circumferential direction towards the same direction as the outside connecting grooves, wherein the inclination angles $\theta1$, $\theta2$, $\theta3$, $\theta4$, and $\theta6$ of the center lines of said outside connecting grooves and said at least one inside connecting groove are gradually decreased from the outside tread edge to the inside tread edge, wherein the first groove center line X1 is straight, the second groove center line X2 is a cranked line, the third groove center line X3 is a cranked line: and the fourth groove center line X4 is straight.

8. A combination of pneumatic tires according to claim 7, wherein the outside lateral grooves of the left tire and the outside lateral grooves of the right tire are inclined in the same direction.

9. A combination of pneumatic tires according to claim 7, wherein the groove center lines X0 of the outside lateral grooves are straight.

* * * * *